US 12,348,955 B2

(12) United States Patent
Krishan et al.

(10) Patent No.: US 12,348,955 B2
(45) Date of Patent: Jul. 1, 2025

(54) METHODS, SYSTEMS, AND COMPUTER READABLE MEDIA FOR SECURING SENSITIVE DATA TO BE TRANSMITTED IN 5G AND SUBSEQUENT GENERATION NETWORKS

(71) Applicant: Oracle International Corporation, Redwood Shores, CA (US)

(72) Inventors: Rajiv Krishan, Cary, NC (US); Anup Shivarajapura, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 269 days.

(21) Appl. No.: 17/987,817

(22) Filed: Nov. 15, 2022

(65) Prior Publication Data

US 2024/0163661 A1    May 16, 2024

(51) Int. Cl.
*H04W 12/02*     (2009.01)
*H04W 12/037*    (2021.01)
*H04W 88/18*     (2009.01)

(52) U.S. Cl.
CPC ......... *H04W 12/02* (2013.01); *H04W 12/037* (2021.01); *H04W 88/182* (2013.01)

(58) Field of Classification Search
CPC .............. H04W 12/02; H04W 12/037; H04W 12/033; H04L 9/0894; H04L 9/40; H04L 63/0428; H04L 2209/42; H04L 2209/80

(Continued)

(56) References Cited

U.S. PATENT DOCUMENTS 11,533,358 B1 * 12/2022 Khare ............... H04L 69/22
2021/0204103 A1 *  7/2021 Bartolomé Rodrigo .............
                                            H04W 8/18

(Continued)

FOREIGN PATENT DOCUMENTS

EP          3886475 A1 *  9/2021 ......... H04L 63/0281
WO   WO-2019196699 A1 * 10/2019 ............ H04L 63/20

OTHER PUBLICATIONS

"3rd Generation Partnership Project; Technical Specification Group Core Network and Terminals; 5G System; Network Function Repository Services; Stage 3 (Release 17)," 3GPP TS 29.510, V17.6.0, pp. 1-306 (Jun. 2022).

(Continued)

*Primary Examiner* — Samson B Lemma
(74) *Attorney, Agent, or Firm* — Jenkins, Taylor & Hunt, P.A.

(57) ABSTRACT

According to another aspect of the subject matter described herein, includes receiving or generating a service based interface (SBI) request message. The method further includes identifying a next-hop network function (NF) of the SBI request message. The method further includes determining, from a registered profile of the next-hop NF, whether the next-hop NF supports handling of encrypted SBI request message parameters. The method further includes in response to determining that the next-hop NF supports handling of encrypted SBI request message parameters: encrypting selected SBI request message parameters; adding one or more headers to the SBI request message or updating one or more headers in the SBI request message to facilitate identification and decryption of the encrypted SBI request message parameters; and transmitting the SBI request message to the next-hop NF.

19 Claims, 9 Drawing Sheets

(58) Field of Classification Search
USPC .......................................................... 726/26
See application file for complete search history.

(56) References Cited

U.S. PATENT DOCUMENTS

| | | | | |
|---|---|---|---|---|
| 2021/0306326 | A1* | 9/2021 | Bykampadi | H04L 63/0281 |
| 2021/0409934 | A1* | 12/2021 | Tiwari | H04W 8/24 |
| 2021/0409942 | A1* | 12/2021 | De Kievit | H04W 8/18 |
| 2022/0295282 | A1* | 9/2022 | Rajput | H04W 8/18 |
| 2023/0396994 | A1* | 12/2023 | Saarinen | G06F 21/602 |
| 2024/0137756 | A1* | 4/2024 | Tiwari | H04W 12/0431 |
| 2024/0196206 | A1* | 6/2024 | Fu | H04W 12/02 |
| 2024/0236661 | A9* | 7/2024 | Tiwari | H04W 12/03 |

OTHER PUBLICATIONS

"3rd Generation Partnership Project; Technical Specification Group Services and System Aspects; System architecture for the 5G System (5GS); Stage 2 (Release 17)," 3GPP TS 23.501, V17.5.0, pp. 1-568 (Jun. 2022).

Jones et al., "JSON Web Signature (JWS)," Internet Engineering Task Force (IETF), Request for Comments: 7515, pp. 1-59 (May 2015).

Townsley et al., "Layer Two Tunneling Protocol L2TP", Network Working Group, Request for Comments: 2661 pp. 1-80 (Aug. 1999).

"3rd Generation Partnership Project; Technical Specification Group Core Network and Terminals; 5G System; Technical Realization of Service Based Architecture; Stage 3 (Release 17)", 3GPP TS 29.500, V17.7.0, pp. 1-127 (Jun. 2022).

Notification of Transmittal of the International Search Report and the Written Opinion of the International Searching Authority, or Declaration for International Application Serial No. PCT/US2023/037093 (Feb. 13, 2024).

* cited by examiner

METHODS, SYSTEMS, AND COMPUTER READABLE MEDIA FOR SECURING SENSITIVE DATA TO BE TRANSMITTED IN 5G AND SUBSEQUENT GENERATION NETWORKS

TECHNICAL FIELD

The subject matter described herein relates to securing data in a communications network. More particularly, the subject matter described herein relates to methods, systems, and computer readable media for securing sensitive to be transmitted in 5G and subsequent generation networks.

BACKGROUND

In 5G telecommunications networks, a network function that provides service is referred to as a producer NF or NF service producer. A network function that consumes services is referred to as a consumer NF or NF service consumer. A network function can be a producer NF, a consumer NF, or both, depending on whether the network function is consuming, producing, or consuming and producing services. The terms "producer NF" and "NF service producer" are used interchangeably herein. Similarly, the terms "consumer NF" and "NF service consumer" are used interchangeably herein.

A given producer NF may have many service endpoints, where a service endpoint is the point of contact for one or more NF instances hosted by the producer NF. The service endpoint is identified by a combination of Internet protocol (IP) address and port number or a fully qualified domain name (FQDN) that resolves to an IP address and port number on a network node that hosts a producer NF. An NF instance is an instance of a producer NF that provides a service. A given producer NF may include more than one NF instance. It should also be noted that multiple NF instances can share the same service endpoint.

NFs register with a network function repository function (NRF). The NRF maintains profiles of available NF instances identifying the services supported by each NF instance. The profile of an NF instance is referred to in 3GPP TS 29.510 as an NF profile. NF instances can obtain information about other NF instances that have registered with the NRF through the NF discovery service operation. According to the NF discovery service operation, a consumer NF sends an NF discovery request to the NRF. The NF discovery request includes query parameters that the NRF uses to locate the NF profiles of producer NFs capable of providing the service identified by the query parameters. NF profiles are data structures that define the type of service provided by an NF instance as well as contact and capacity information regarding the NF instance.

A service communication proxy (SCP) can also invoke the NF discovery service operation to learn about available producer NF instances. The case where the SCP uses the NF discovery service operation to obtain information about producer NF instances on behalf of consumer NFs is referred to as delegated discovery. Consumer NFs connect to the SCP, and the SCP load balances traffic among producer NF service instances that provide the required services or directly routes the traffic to the destination producer NF instances.

In addition to the SCP, another example of an intermediate proxy that forwards traffic between producer and consumer NFs is the security edge protection proxy (SEPP). The SEPP is the network function used to protect control plane traffic that is exchanged between different 5G public land mobile networks (PLMNs). As such, the SEPP performs message filtering, policing and topology hiding for all application programming interface (API) messages that are transmitted between PLMNs.

One problem in 5G and other types of networks is protecting sensitive data transmitted over the network. There are many types of sensitive data exchanged between NFs in 5G networks, including subscriber and subscription-identifying data, such as the subscription permanent identifier (SUPI), the general public subscription identifier (GPSI), the permanent equipment identifier (PEI), other subscriber-related data, or policy data. This type of information can be used to masquerade as a legitimate subscriber and gain access to other subscriber data.

One way to protect these and other types of data is to encrypt transfers of the data using secure hyper text transfer protocol (HTTPs). HTTPs relies on transport layer security (TLS) to secure data transfers between communicating endpoints. While HTTPs provides adequate data protection when it is used, HTTPs is not used for all data transfers in the network. For example, a consumer NF may use HTTP instead of HTTPs when communicating a request to a producer NF or a load balancer in the same network. Transmission of logs and trace data within a service provider's network may likewise be unsecured. In addition, encryption at the TLS level requires that the entire transport layer payload be encrypted, which is less efficient that encrypting selected message parameters deemed to have sensitive data. Further, TLS encryption is point-to-point, which means that encrypted data must be decrypted and then re-encrypted when sending the data over multiple network hops, and there is no guarantee of end-to-end security if a single hop does not perform TLS encryption.

Because HTTPs is not universally used for 5G data transmissions, there exists a need for a mechanism to protect sensitive data transmitted in 5G and subsequent generation networks. Protecting sensitive data includes determining which NFs support encryption and which do not, indicating when a message includes sensitive data that is encrypted, indicating which message parameter or attribute values are encrypted, and communicating cryptographic parameters between a sending NF and a receiving NF.

Accordingly, in light of these and other difficulties, there exists a need for methods, systems, and computer readable media for securing sensitive data to be transmitted in 5G and subsequent generation networks.

SUMMARY

A method for securing sensitive data to be transmitted in 5G and subsequent generation networks includes receiving or generating a service based interface (SBI) request message. The method further includes identifying a next-hop network function (NF) of the SBI request message. The method further includes determining, from a registered profile of the next-hop NF, whether the next-hop NF supports handling of encrypted SBI request message parameters. The method further includes in response to determining that the next-hop NF supports handling of encrypted SBI request message parameters: encrypting selected SBI request message parameters; adding one or more headers to the SBI request message or updating one or more headers in the SBI request message to facilitate identification and decryption of the encrypted SBI request message parameters; and transmitting the SBI request message to the next-hop NF.

According to another aspect of the subject matter described herein, receiving or generating an SBI request message includes generating the SBI request message at a consumer NF.

According to another aspect of the subject matter described herein, receiving or generating an SBI request message includes receiving or generating the SBI request message at a service communication proxy (SCP) or security edge protection proxy (SEPP).

According to another aspect of the subject matter described herein, the registered profile includes a profile of the next-hop NF registered with an NF repository function (NRF).

According to another aspect of the subject matter described herein, determining whether the next-hop NF supports handling of encrypted SBI request message parameters includes determining that the next-hop NF supports handling of encrypted SBI request message parameters and encrypting selected SBI request message parameters includes encrypting SBI request message parameters deemed by a network operator to contain sensitive data.

According to another aspect of the subject matter described herein, adding one or more headers to the SBI request message or updating one or more headers in the SBI request message includes adding or updating a first header identifying the encrypted SBI request message parameters and at least one second header including at least one parameter to facilitate decryption of the encrypted SBI request message parameters.

According to another aspect of the subject matter described herein, receiving or generating the SBI request includes receiving the SBI request, where the SBI request includes encrypted SBI request message parameters and one or more headers to facilitate identification and decryption of the encrypted SBI request message parameters, determining whether the next-hop NF supports handling of encrypted SBI request message parameters includes determining that the next-hop NF supports handling of encrypted SBI request message parameters and the method further comprises decrypting the encrypted SBI request message parameters, and encrypting the selected SBI request message parameters includes re-encrypting the decrypted SBI request message parameters using a secret key shared with the next-hop NF; and adding one or more headers to the SBI request message or updating one or more headers in the SBI request message includes updating the one or more headers to identify the re-encrypted SBI request message parameters and to facilitate decryption of the re-encrypted SBI request message parameters by the next-hop NF.

According to another aspect of the subject matter described herein, receiving or generating the SBI request message includes receiving the SBI request message, where the SBI request message includes encrypted SBI request message parameters and one or more headers to facilitate identification and decryption of the encrypted SBI request message parameters and determining whether the next-hop NF supports handling of encrypted SBI request message parameters includes determining that the next-hop NF does not support handling of encrypted SBI request message parameters and, in response: decrypting the encrypted SBI request message parameters to produce plaintext SBI request message parameters; replacing, in the SBI request message, the encrypted SBI request message parameters with the plaintext SBI request message parameters; and transmitting the SBI request message with the plaintext SBI request message parameters to the next-hop NF.

According to another aspect of the subject matter described herein, the method for protecting sensitive data to be transmitted in the 5G or subsequent generation network includes detecting the presence of the encrypted SBI request message parameters using the one or more headers.

According to another aspect of the subject matter described herein, the selected SBI request message parameters include Third Generation Partnership Project (3GPP)-defined subscriber or subscription-identifying parameters at the SBI request message level, rather than a transport layer message level.

According to another aspect of the subject matter described herein, a system for protecting sensitive data to be transmitted in a 5G or subsequent generation network is provided. The system includes a network function (NF) including at least one processor. The system further includes a service based interface (SBI) request message data protector implemented by the at least one processor for receiving or generating an SBI request message, identifying a next-hop NF of the SBI request message, determining, from a registered profile of the next-hop NF, whether the next-hop NF supports handling of encrypted SBI request message parameters, and, in response to determining that the next-hop NF supports handling of encrypted SBI request message parameters: encrypting selected SBI request message parameters; adding one or more headers to the SBI request message or updating one or more headers in the SBI request message to facilitate identification and decryption of the encrypted SBI request message parameters; and transmitting the SBI request message to the next-hop NF.

According to another aspect of the subject matter described herein, the NF comprises a consumer NF.

According to another aspect of the subject matter described herein, the NF comprises a service communication proxy (SCP) or security edge protection proxy (SEPP).

According to another aspect of the subject matter described herein, the registered profile includes a profile of the next-hop NF registered with an NF repository function (NRF).

According to another aspect of the subject matter described herein, the SBI request message data protector is configured to determine that the next-hop NF supports handling of encrypted SBI request message parameters and to encrypt SBI request message parameters deemed by a network operator to contain sensitive data.

According to another aspect of the subject matter described herein, the SBI request message data protector is configured to add or update a first header identifying the encrypted SBI request message parameters and at least one second header including at least one parameter to facilitate decryption of the encrypted SBI request message parameters.

According to another aspect of the subject matter described herein, the SBI request message data protector is configured to: receive the SBI request, where the SBI request includes encrypted SBI request message parameters and one or more headers including data to facilitate identification and decryption of the encrypted SBI request message parameters; determine that the next-hop NF supports handling of encrypted SBI request message parameters; decrypt the encrypted SBI request message parameters; encrypt the selected SBI request message parameters by re-encrypting the decrypted SBI request message parameters using a secret key shared with the next-hop NF; and update the one or more headers to identify the re-encrypted SBI request message parameters and to facilitate decryption of the re-encrypted SBI request message parameters by the next-hop NF.

According to another aspect of the subject matter described herein, the SBI request message data protector is configured to receive the SBI request message, where the SBI request message includes encrypted SBI request message parameters and one or more headers to facilitate identification and decryption of the encrypted SBI request message parameters; and the SBI request message data protector is configured to determine that the next-hop NF does not support handling of encrypted SBI request message parameters and, in response: decrypt the encrypted SBI request message parameters to produce plaintext SBI request message parameters; replace, in the SBI request message, the encrypted SBI request message parameters with the plaintext SBI request message parameters; and transmit the SBI request message with the plaintext SBI request message parameters to the next-hop NF.

According to another aspect of the subject matter described herein, the SBI request message data protector is configured to detect the presence of the encrypted SBI request message parameters using the one or more headers.

According to another aspect of the subject matter described herein, a non-transitory computer readable medium having stored thereon executable instructions that when executed by a processor of a computer control the computer to perform steps is provided. The steps include receiving or generating a service based interface (SBI) request message. The steps further include identifying a next-hop network function (NF) of the SBI request message. The steps further include determining, from a registered profile of the next-hop NF, whether the next-hop NF supports handling of encrypted SBI request message parameters. The steps further include, in response to determining that the next-hop NF supports handling of encrypted SBI request message parameters, encrypting selected SBI request message parameters, adding one or more headers to the SBI request message or updating one or more headers in the SBI request message to facilitate identification and decryption of the encrypted SBI request message parameters, and transmitting the SBI request message to the next-hop NF.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Exemplary implementations of the subject matter described herein will now be explained with reference to the accompanying drawings, of which.

DETAILED DESCRIPTION

Figure 1:
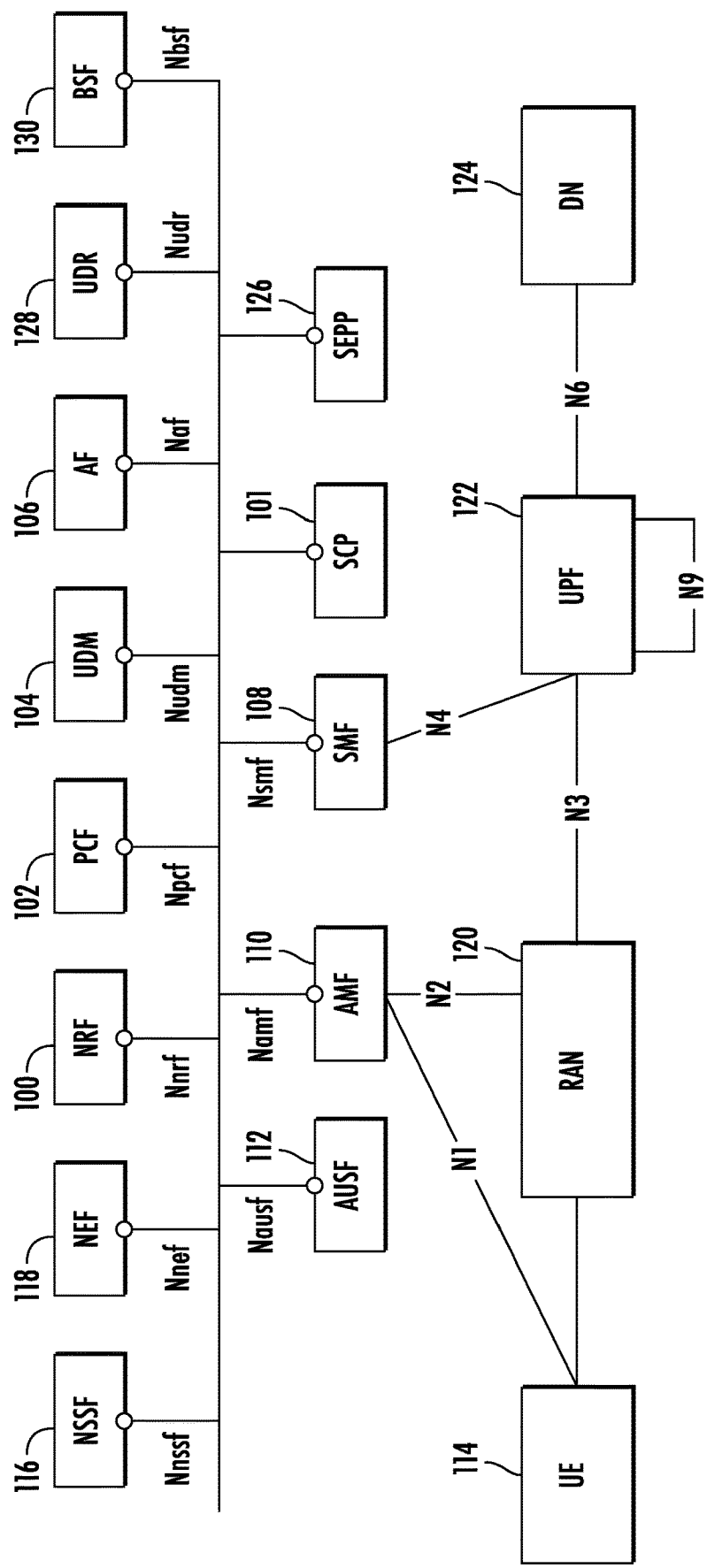
FIG. 1 is a network diagram illustrating an exemplary 5G system network architecture.

FIG. 1 is a block diagram illustrating an exemplary 5G system network architecture. The architecture in FIG. 1 includes NRF 100 and SCP 101, which may be located in the same home public land mobile network (HPLMN). As described above, NRF 100 may maintain profiles of available NF instances and their supported services and allow consumer NFs or SCPs to subscribe to and be notified of the registration of new/updated NF instances. SCP 101 may also support service discovery and selection of NF instances. SCP 101 may perform load balancing of connections between consumer and producer NFs.

NRF 100 is a repository for profiles of NF instances. In order to communicate with a producer NF instance, a consumer NF or an SCP must obtain the NF profile of the producer NF instance from NRF 100. The NF profile is a JavaScript object notation (JSON) data structure defined in 3GPP TS 29.510. The NF profile includes attributes that indicate the type of service provided, capacity of the NF instance, and information for contacting the NF instance.

In FIG. 1, any of the network functions can be consumer NFs, producer NFs, or both, depending on whether they are requesting, providing, or requesting and providing services. In the illustrated example, the NFs include a policy control function (PCF) 102 that performs policy related operations in a network, a unified data management function (UDM) 104 that manages user data, and an application function (AF) 106 that provides application services.

The NFs illustrated in FIG. 1 further include a session management function (SMF) 108 that manages sessions between AMF 110 and PCF 102. AMF 110 performs mobility management operations similar to those performed by a mobility management entity (MME) in 4G networks. An authentication server function (AUSF) 112 performs authentication services for user equipment (UEs), such as user equipment (UE) 114, seeking access to the network.

NSSF 116 provides network slicing services for devices seeking to access specific network capabilities and characteristics associated with a network slice. The NSSF provides the NSSelection service, which allows NFs to request information about network slices, and the NSSAIAvailability service, which enables NFs to update and subscribe to receive notification of updates in NSSAI availability information.

A network exposure function (NEF) 118 provides application programming interfaces (APIs) for application functions seeking to obtain information about Internet of things (IoT) devices and other UEs attached to the network. NEF 118 performs similar functions to the service capability exposure function (SCEF) in 4G networks.

A radio access network (RAN) 120 connects user equipment (UE) 114 to the network via a wireless link. Radio access network 120 may be accessed using a gNB (not shown in FIG. 1) or other wireless access point. A user plane function (UPF) 122 can support various proxy functionality for user plane services. One example of such proxy functionality is multipath transmission control protocol (MPTCP) proxy functionality. UPF 122 may also support performance measurement functionality, which may be used by UE 114 to obtain network performance measurements. Also illustrated in FIG. 1 is a data network (DN) 124 through which UEs access data network services, such as Internet services.

SEPP 126 filters incoming traffic from another PLMN and performs topology hiding for traffic exiting the home PLMN. SEPP 126 may communicate with a SEPP in a foreign PLMN which manages security for the foreign PLMN. Thus, traffic between NFs in different PLMNs may traverse two SEPP functions, one for the home PLMN and the other for the foreign PLMN. A unified data repository (UDR) 128 stores subscription data for UEs. A binding support function (BSF) 130 manages binding between PDU sessions and PCFs.

As stated above, one problem in 5G networks is how to protect sensitive data transmitted over the network. Based on the use case, certain attributes in a service request message can be considered sensitive. Examples of such attributes that might be considered sensitive include the SUPI, GPSI, PEI, subscriber related data, policy data, etc. Even though there are various safety measures put in place by Third Generation Partnership Project (3GPP) standards to have secure data transfer, data can be maliciously accessed by other parties, for example, because of gaps in security procedures. Examples of cases where data security can be breached include:

Unsecured transfer of data from consumer to producer, e.g., using HTTP instead of HTTPs.

Unsecured transfer to data within internal services, e.g., using HTTP instead of HTTPs from or to a load balancer or within service models of an SCP or producer NF.

Logs/tracing data generated by intermediate nodes (or observability components like a service mesh) containing sensitive data, etc.

Thus, there is a need to provide an alternate mechanism where sensitive data between 5G endpoints can be transmitted securely.

The Internet Engineering Task Force (IETF) has provided guidelines in Request for Comments (RFC) 2661 to hide sensitive data. This model has been successfully adapted to enable encryption of data using Diameter or Radius protocols. However, there are challenges in implementing the security model suggested by RFC 2661 in 5G data transmissions. First, features of the data security model in RFC 2661 will be described. Next, challenges in implementing RFC 2661 security features will be described. After that, solutions to implementing the identified challenges in 5G and subsequent generation networks will be described.

It should be noted that IETF RFC 2661 defines security procedures implemented for the layer 2 tunneling protocol (L2TP), a protocol used at layer 2 in the Open Systems Interconnect (OSI) model rather than at the SBI request message parameters level in 5G networks. According to RFC 2661, the H bit in the header of each AVP provides a mechanism to indicate to the receiving peer whether the contents of the AVP are hidden or present in cleartext. The H bit must only be set if a shared secret exists between an L2TP access concentrator (LAC) and an L2TP network server (LNS). Hiding an AVP value is done in several steps. Data is encrypted using a shared secret S, a Random Vector (RV), and the Attribute Value (AV), i.e., the value being encrypted. If the H bit is set in any AVP(s) in a given control message, a Random Vector AVP must also be present in the message and must precede the first AVP having an H bit of 1.

To summarize, according to RFC 2661, the random vector and encrypted data will be transmitted over the wire. A shared-secret is known to the sender and receiver prior to transmission between the sender and receiver. To decrypt encrypted attributes in a message, the receiver needs the shared-secret (known offline), the random vector (from the message), and the encrypted data (from the message).

Challenges with implementing RFC 2661 or similar security features in 5G and subsequent generation networks include the following:

1. Determining whether the producer NF or SCP/SEPP supports handling of encrypted SBI message parameters.

A consumer NF/SCP/SEPP may be communicating with producer NFs of the same type from different vendors. The consumer NF/SCP/SEPP needs a way to identify whether a producer NF or other next-hop NF supports handling of encrypted SBI request message parameters.

2. Who shall encrypt the data?

Does data have to be encrypted by the consumer NF, or can encryption be done by the SCP/SEPP to enable secure transmission of sensitive data between SCP/SEPP to producer or SCP to SEPP or SEPP to SCP or SCP to SCP only.

3. A shared secret or key required for encrypting and decrypting sensitive data.
    As part of a security policy, a network operator may need to rotate the shared secret to avoid security threats.
    When a secret is being rotated, there is a window where a client may have a new secret and the receiver has an old secret (or vice-versa). Thus, there is a need to gracefully and securely handle changes of shared secret. Rotation and exchange of shared secrets goes beyond the security features described in RFC2661.
4. How should encrypted data, random vectors, and other security-related parameters be placed in 5G service requests? How should a 5G sender, such as a consumer NF, SCP, or SEPP, communicate to a receiver, such as an SCP, SEPP, or producer NF, which parameters are encrypted in a service request message?

Figure 2:
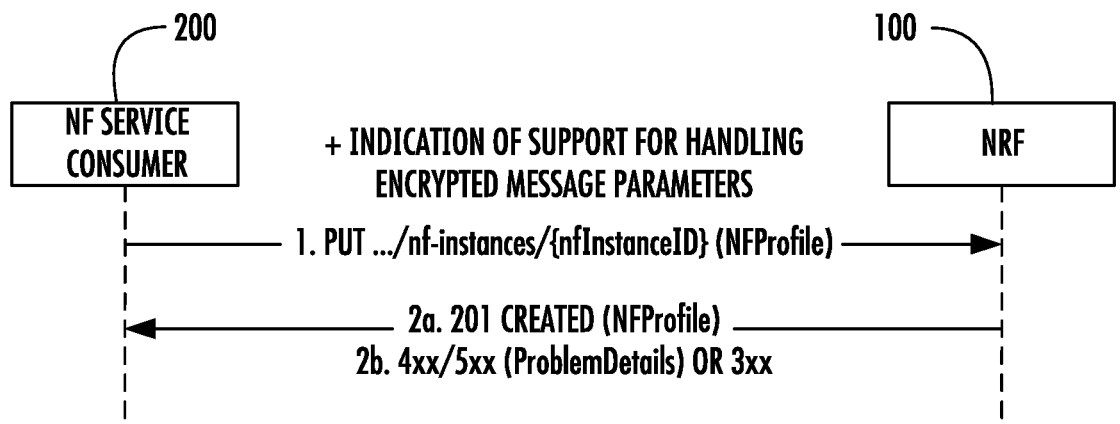
FIG. 2 is a message flow diagram illustrating the use of the NF register service operation to indicate support for encryption of sensitive data in SBI request message parameters and handling of encrypted SBI request message parameters.

To address the first challenge (how to communicate support for support for handling of encrypted SBI request message parameters), the subject matter described herein enables NFs to use the NFRegister service operation described in 3GPP TS 29.510 to register support for handling of encrypted SBI request message parameters and the NF discover service operation for other NFs to discover an NF's support for support for handling of encrypted SBI request message parameters. FIG. 2 is a message flow diagram illustrating the use of the NFRegister service operation to indicate support for support for handling of encrypted SBI request message parameters. Referring to FIG. 2, in line 1, an NF service consumer 200 (i.e., a producer NF that is consuming the services of the NRF) sends an NFRegister request to NRF 100. The NFRegister request carries the NF or service profile of NF service consumer 200. NF service consumer 200 adds to the NFRegister request an indication of support for support for handling of encrypted SBI request message parameters. In one example, the indication of support for support for handling of encrypted SBI request message parameters may be carried in a supportedVendorSpecificFeatures attribute of the NF or service profile. 3GPP TS 29.510 allows a producer NF to provide a supportedVendorSpecificFeatures attribute in its NF or service NF profile. The supportedVendorSpecificFeatures attribute contains a map of vendor specific features. In this example, one of the features is an encryptedSensitiveData feature, which indicates support for handling of encrypted SBI request message parameters. Similarly, an SCP/SEPP that supports handling of encrypted SBI request message parameters may add the EncryptedSensitiveData feature to the supportedVendorSpecificFeatures attribute of its SCP or SEPP profile.

Returning to FIG. 2, if the NFRegister service operation is successful, NRF 100 responds as indicated in line 2a with a 200 OK message indicating successful registration of the NF or service profile. If the NFRegister request is re-directed or processing of the NFRegister request is not successful, NRF 100 responds as indicated in line 2b with a 4xx or 5xx message indicating problem details or a 3xx message indicating redirection. Once the NF or service profile is successfully registered with NRF 100, other NFs can use the NFDiscover service operation to determine whether a peer NF, e.g., a producer NF, an SCP, or an SEPP supports handling of encrypted SBI request parameters.

Figure 3:
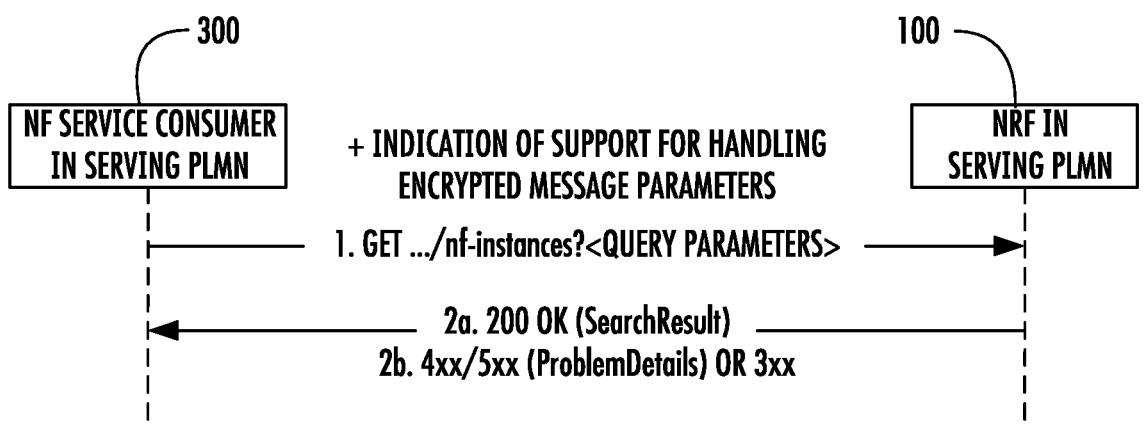
FIG. 3 is a message flow diagram illustrating the use of the NF discover service operation to determine that another NF supports handling of encrypted SBI request message parameters.

FIG. 3 is a message flow diagram illustrating exemplary messages exchanged in the NFDiscover service operation. Referring to FIG. 3, in step 1, an NF service consumer 300 seeking to discover information about other NFs in the network sends an NFDiscover request to NRF 100. The NFDiscover request includes query parameters that NRF 100 uses to generate a list of NF or service profiles of producer NFs capable of providing the service indicated by the query parameters. If the NFDiscover service operation is successful, NRF 100 responds as indicated in line 2a with a 200 OK message containing a list of NF or service profiles of the producer NFs matching the query parameters. According to an aspect of the subject matter described herein, for producer NFs that have registered support for handling of encrypted SBI request message parameters, the NF or service profiles may include the above-described indication of support for handling of encrypted SBI request message parameters. For example, for the producer NFs that support handling of encrypted SBI request message parameters, the NF or service profiles may include a supportedVendorSpecificFeatures attribute with the EncryptedSensitiveData feature as one of features in the feature list. If the NFDiscover service operation is not successful or is redirected, NRF 100 responds as indicated in line 2b with a 4xx or 5xx message indicating problem details or a 3xx message indicating redirection. Once NF service consumer 300 learns that a producer NF, SCP, or SEPP supports handling of encrypted SBI request message parameters, consumer NF 300 can include encrypted message parameters in service request messages transmitted to the producer NF, SCP, or SEPP. NF service consumer 300 must still address the issues of who should encrypt the data, how to encrypt, and how to communicate to the receiver which data in a message is encrypted.

Figure 4:
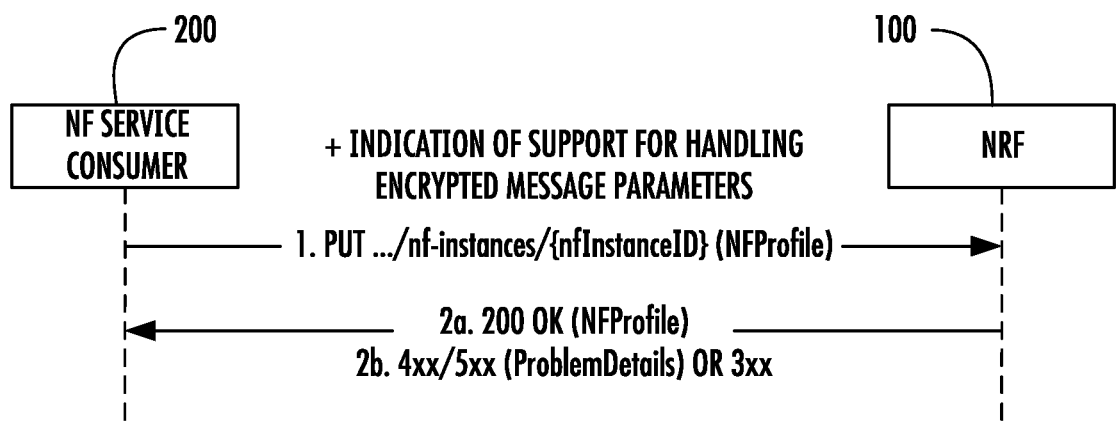
FIG. 4 is a message flow diagram illustrating the use of the NF update service operation to indicate support for encryption of sensitive data in SBI request message parameters and handling of encrypted SBI request message parameters.

It should be noted that the subject matter described herein is not limited to using the NFRegister service operation to register support for handling of encrypted data. For example, an NF service consumer may use the NFUpdate service operation to update an existing NF or service profile with the NRF to indicate support for handling of encrypted SBI request message parameters. FIG. 4 is a message flow diagram illustrating the NFUpdate service operation and its use to indicate support for handling of encrypted SBI request message parameters. Referring to FIG. 4, in line 1, NF service consumer 200 sends an NFUpdate request to NRF 100 to update its NF or service profile with NRF 100. In this example, the NFUpdate request contains the complete NF or service profile of NF service consumer 200 to replace the existing NF or service profile of NF service consumer 200 registered with NRF 100. In an alternate example, if a partial NF or service profile update is being requested, the NFUpdate request will contain the attributes of the NF or service profile being replaced and the HTTP PATCH method, instead of the HTTP PUT method, will be used in the NF service request. In either case, the complete NF profile or the attributes of the NF service profile being replaced will include the indication of encrypted SBI request message parameter handling described above. If the NFUpdate service operation is successful, NRF 100 responds as indicated in line 2a with a 200 OK message. If the NFUpdate or service request is not successful or is redirected, NRF 100 responds as indicated in line 2b with a 4xx or 5xx message indicating problem details or a 3xx message indicating redirection. Once the NF or service profile is updated to include the indication of support for handling encrypted message parameters, other NFs can learn of the support for handling encrypted message parameters using the NFDiscover service operation.

Figure 5A:
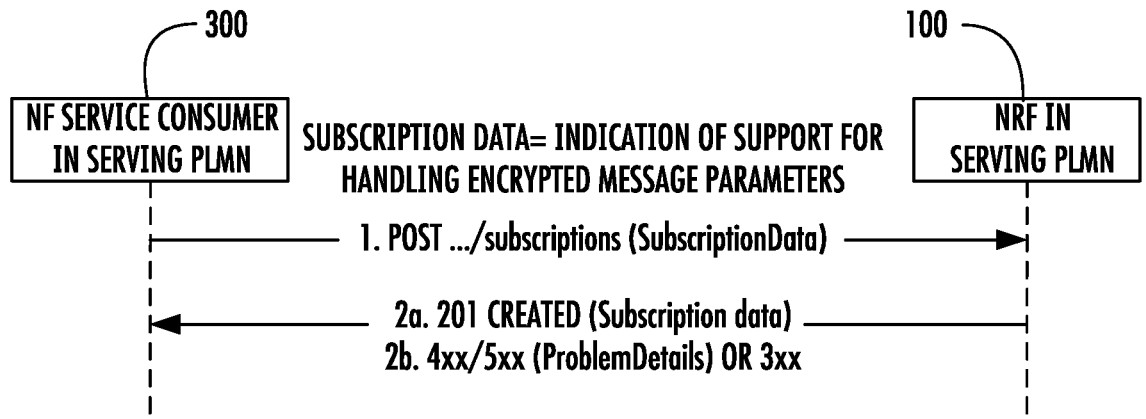
FIGS. 5A and 5B are message flow diagrams illustrating the use of the nfStatusSubscribe and nfStatusNotify service operations to determine that another NF supports handling of encrypted SBI service request message parameters.
Figure 5B:
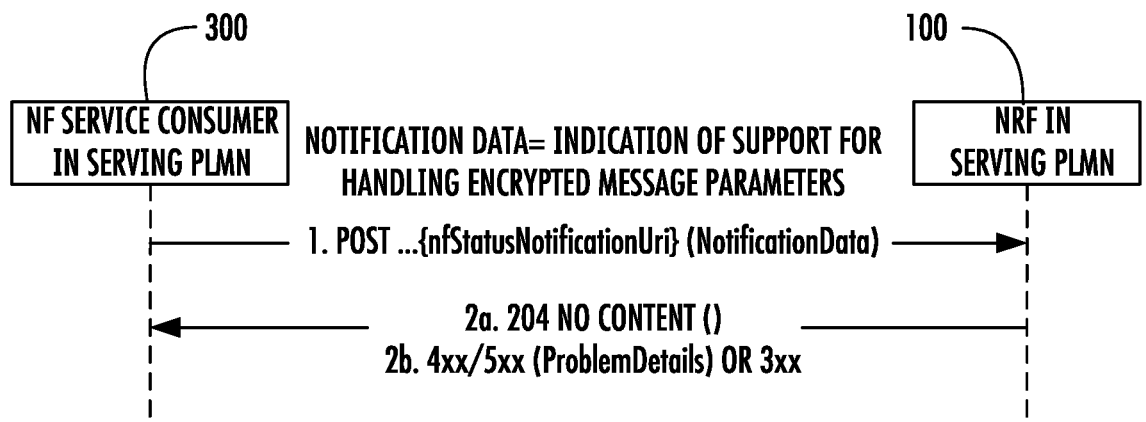

The subject matter described herein is not limited to consumer NFs learning of support for handling encrypted message parameters using the NFDiscover service operation. For example, a consumer NF may also learn of another NF's support for handling encrypted message parameters using the NFStatusSubscribe and NFStatusNotify service operations. FIGS. 5A and 5B illustrate the use of the NFStatusSubscribe and NFStatusNotify service operations to learn of support for handling of encrypted SBI request message parameters. Referring to FIG. 5A, in line 1, NF service consumer 300 sends an NFStatusSubscribe request to NRF 100. The NFStatusSubscribe request includes subscription data which indicates the type of events for which NF service consumer desires to receive notification. In this example, the events include changes to the NF or service profiles of NFs that indicate either adding or removing support for handling of encrypted SBI request message parameters. If the creation of the subscription is successful, NRF 100 responds as indicated in line 2a with a 201 Created message containing subscription data, such as a subscription Id. If creation of the subscription is not successful or if the request is redirected, NRF 100 responds as indicated in line 2b with a 4xx or 5xx message specifying problem details or a 3xx message indicating redirection.

Referring to FIG. 5B, when NRF 100 detects the occurrence of an event that matches subscription data for one of the subscriptions created with NRF 100, NRF 100 responds as indicated in line 1 by sending a notification request message to subscribing NFs, such as NF service consumer 300. The notification request message includes notification data for the event matching the subscription data. In this example, the notification data includes the indication of support for handling of encrypted SBI request message parameters. If the notification request is successfully processed by NF service consumer 300, NF service consumer 300 responds with a 204 No Content message. If the notification request is not successfully processed by NF service consumer 300 or is redirected, NF service consumer 300 responds as indicated in line 2b with a 4xx or 5xx message indicating problem details or a 3xx message indicating redirection.

Turning now to the second challenge with implementing handling of encrypted SBI request message parameters in 5G networks of who should encrypt the data, options are the consumer NF that originates a service request message or an SCP or SEPP that forwards a service request message. Encrypting message parameters using the subject matter described herein can be performed at any or all of a consumer NF, an SCP, or an SEPP. In one example, to enable encryption of sensitive data in SBI request message parameters, it is recommended that the consumer NF encrypt the sensitive data if the next-hop SCP/SEPP supports encrypted attribute handling. i.e., as indicated by the encryptedSensitiveData feature in the supportedVendorSpecificFeatures attribute of the SCP's/SEPP's NF profile. However even if the consumer NF or previous hop SCP sends sensitive data in plaintext format, then the intermediate SCP/SEPP may encrypt the sensitive data based on the encryptedSensitiveData feature in the supportedVendorSpecificFeatures attribute of profile for the next-hop SCP, SEPP, or producer NF. Message flow examples of encrypting sensitive data at the originating NF and at intermediate NFs are described in detail below.

To address the third challenge with implementing the handling of encrypted SBI request message parameters of using a shared secret key, the key Id (kid) header parameter described in Section 4.1.4 of IETF RFC 7515 may be used to indicate which key should be used to decrypt encrypted message parameters. According to Section 4.1.4 of RFC 7515, the key ID header parameter provides a hint indicating which key was used to secure a JavaScript web signature (JWS). This parameter allows originators to explicitly signal a change of key to recipients. The structure of the "kid" value is unspecified. Its value must be a case-sensitive string. Use of this Header Parameter is optional. When used with a JWK, the "kid" value is used to match a JWK "kid" parameter value.

The "kid" value or a similar concept may be used to communicate to a receiving NF the identity of the key that can be used to decrypt message attributes. The encrypting entity (e.g., a sending NF) provides the key Id of the shared secret used to encrypt the attributes in the 5G service request message. The receiving NF will then use the key Id to access the shared secret and use the shared secret to decrypt encrypted message parameters or attributes.

It should be noted that intermediate nodes, such as the SCP/SEPP can decrypt and re-encrypt with and updated key/shared secret (if required) before forwarding to the next-hop NF. This is based on how the network operator sets up the scope of the key Id and shared secret between various SCP/SEPP instances in its network. How operator enables sharing of the key Id and associated secret with NFs and SCPs is implementation specific. There are many open source and proprietary solutions available to enable loading of one or more key Ids and certificates/secrets with multiple applications.

To address the fourth challenge referenced above of how a sending NF indicates to a receiving NF that a message includes encrypted parameters, which parameters in the message are encrypted, and data to facilitate decryption, the sending NF may or update or add one or more vendor-encrypted* headers to an SBI request message (where "*" is a wildcard to indicate that there may be more than one type of vendor-encrypted header). The presence of vendor-encrypted-* headers allows the receiving producer NF/SCP/SEPP to know the service request has encrypted attributes. If a service request is received at an intermediate SCP/SEPP (i.e., an SCP or SEPP that is not the final destination for the service request), the presence of the vendor-encrypted-* headers allows the intermediate SCP/SEPP to select a producer NF that supports handling of messages with encrypted parameters. For example, if there are multiple producer NFs that provide the service requested by a service request received by an SCP or SEPP, and the service request includes encrypted parameters, the SCP or SEPP may select one of the producer NFs that supports handling of messages with encrypted parameters. If there are no producer NFs that support handling of messages with encrypted parameters, the SCP or SEPP may decrypt the encrypted parameters, replace the encrypted parameters in the message with the decrypted parameters, and forward the message with the decrypted parameters to one of the producer NFs that can provide the service requested by the service request message. The SCP or SEPP may run this additional logic (in addition to SCP or SEPP routing logic) for handling encrypted service requests (e.g., during SCP to SCP, SEPP to SCP, SCP to SEPP, SCP to producer NF, or SEPP to producer NF routing).

One type of vendor-encrypted-* header that may be added to a message with encrypted attributes is a custom header referred to as the "vendor-encrypted-params" header. The vendor-encrypted-params header may indicate which parameters in a message are encrypted. In one example, the vendor-encrypted-params header may include a comma separated list identifying parameters in the body of the SBI message that are encrypted by the sending NF. Nested parameters can be specified using JavaScript object notation (JSON) annotation format e.g., a.b.

Another type of vendor encrypted-* header that a sending NF may add to a message with encrypted parameters is a "vendor-encrypted-random-id" header containing a random vector string (as described in IETF RFC 2661). According to RFC 2661, the random vector string is part of a random vector AVP that a party sending encrypted information uses to create an MD5 hash. In particular, RFC 2661 indicates that an MD5 hash is performed on the concatenation of:
- the 2 octet Attribute number of the AVP,
- + the shared secret, and
- + an arbitrary length random vector.

The MD5 hash is XORed with the first 16 octets (or less) segment of the Hidden AVP Subformat and placed in the Attribute Value field of the Hidden AVP. The Hidden AVP Subformat contains the length in octets of the original value being encrypted and the attribute value to be obscured. The original value is replaced with (hash value) XOR (original attribute value). Example parameter encryption operations specified in RFC 2661 are as follows:

Call the shared secret S, the Random Vector RV, and the Attribute Value AV. Break the value field into 16-octet chunks p1, p2, etc. with the last one padded at the end with random data to a 16-octet boundary. Call the ciphertext blocks c(1), c(2), etc. We will also define intermediate values b1, b2, etc.

$$b1=MD5(AV+S+RV)c(1)=p1 \text{ XOR } b1$$

$$b2=MD5(S+c(1))c(2)=p2 \text{ XOR } b2$$

$$\ldots$$

$$bi=MD5(S+c(i-1))c(i)=pi \text{ XOR } bi$$

A sending or intermediate NF may perform these operations to encrypt message attributes containing sensitive data before transmitting a request message over the 5G network.

The sending or intermediate NF may add a third header to a service request message that includes the key Id described above. The third custom header is referred to as the "vendor-encrypted-id" header. The key Id will be used by the next-hop SCP/SEPP/producer NF to fetch the key/shared-secret and use the key or shared secret to decrypt the encrypted parameters in the message.

Figure 6:
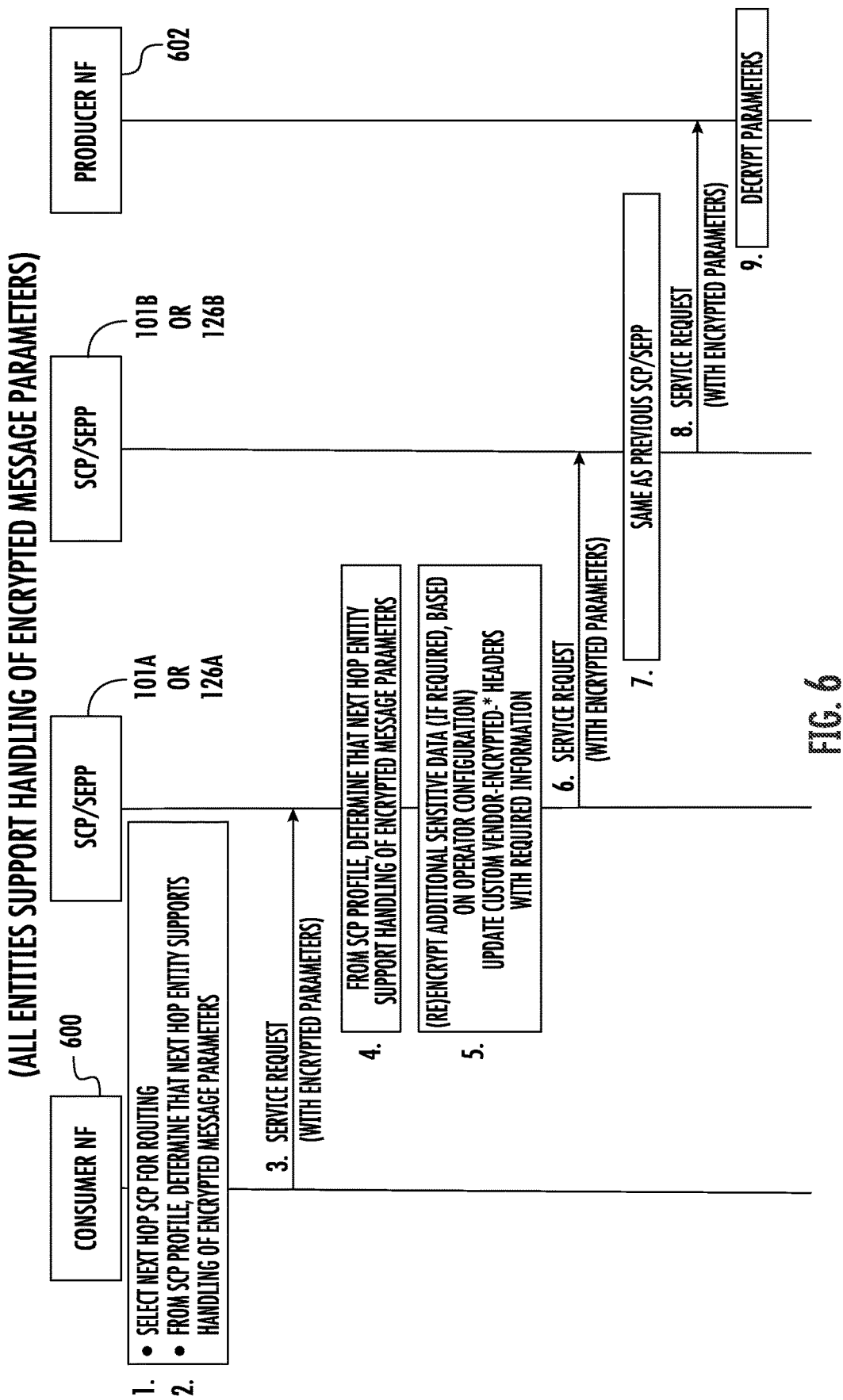
FIG. 6 is a message flow diagram illustrating exemplary messages exchanged in a 5G network when all entities that originate or receive a service request message support handling of encrypted SBI request message parameters.

FIG. 6 is a message flow diagram illustrating exemplary messages exchanged when all entities in the 5G network in the routing path of an SBI request message support handling of encrypted SBI request message parameters. Referring to FIG. 6, in step 1, a consumer NF 600 selects a next-hop SCP or SEPP for routing of an SBI request message. In step 2, consumer NF 600 accesses the SCP or SEPP profile of next-hop SCP/SEPP 101A or 126A to determine whether SCP/SEPP 101A or 126A supports handling of encrypted SBI request message parameters. Consumer NF 600 may have obtained the SCP or SEPP profile from the NRF (not shown in FIG. 6) using the NFDiscover or NFStatusSubscribe service operations. In this example, based on the presence of the encryptedSensitiveData feature in the VendorSpecificFeatures attribute of the SCP or SEPP profile, consumer NF 600 determines that the next-hop SCP/SEPP 101A or 126A supports handling of encrypted SBI request message parameters.

In step 3, consumer NF 600 encrypts sensitive data to be inserted in the SBI request message, inserts the encrypted data in the SBI request, and sends the SBI request to next-hop SCP/SEPP 101A or 126A. The specific parameters that are encrypted may depend on network operator configuration. Examples of parameters that may be encrypted include subscription and/or subscriber identifying parameters, such as those described above. Consumer NF 600 also adds the above described vendor-encrypted-* headers to the message.

In step 4, SCP/SEPP 101A or 126A determines whether the next-hop network function supports handling of encrypted SBI request message parameters. SCP/SEPP 101A or 126A may make this determination by accessing the SCP or SEPP profile of SCP/SEPP 101B or 126B that SCP/SEPP 101A or 126A obtained from the NRF using the NFDiscover or NFStatusSubscribe service operation. In step 6, SCP/SEPP 101A or 126A encrypts or re-encrypts sensitive data in the message based on operator configuration and updates the custom vendor-encrypted-* headers with the required information. For example, if SCP/SEPP 101A or 126A determines that SCP/SEPP 101B or 126B supports handling of encrypted SBI request message parameters, SCP/SEPP 101A or 126A may decrypt the encrypted message parameters using the shared secret with consumer NF 600, re-encrypt the parameters using the shared secret with SCP/SEPP 101B or 126B, and update the vendor-encrypted-* headers to include an indication of which parameters are encrypted and the random string and key Id to facilitate decryption of the parameters. Alternatively, if the same shared secret is used with consumer NF 600 and SCP/SEPP 101B or 126B, decryption and re-encryption may not be required.

In step 8, SCP/SEPP 101B or 126B receives the SBI request message, performs similar operations to SCP/SEPP 101A or 126A and forwards the SBI request message to producer NF 602. In step 9, producer NF 602 identifies the encrypted message parameters and decrypts the encrypted message parameters using the data in the vendor-encrypted-* headers. Thus, using the methodology illustrated in FIG. 6, sensitive data carried in SBI request message attributes can be protected end to end when all of the entities in the routing path for the message support handling of encrypted SBI request message parameters.

Figure 7:
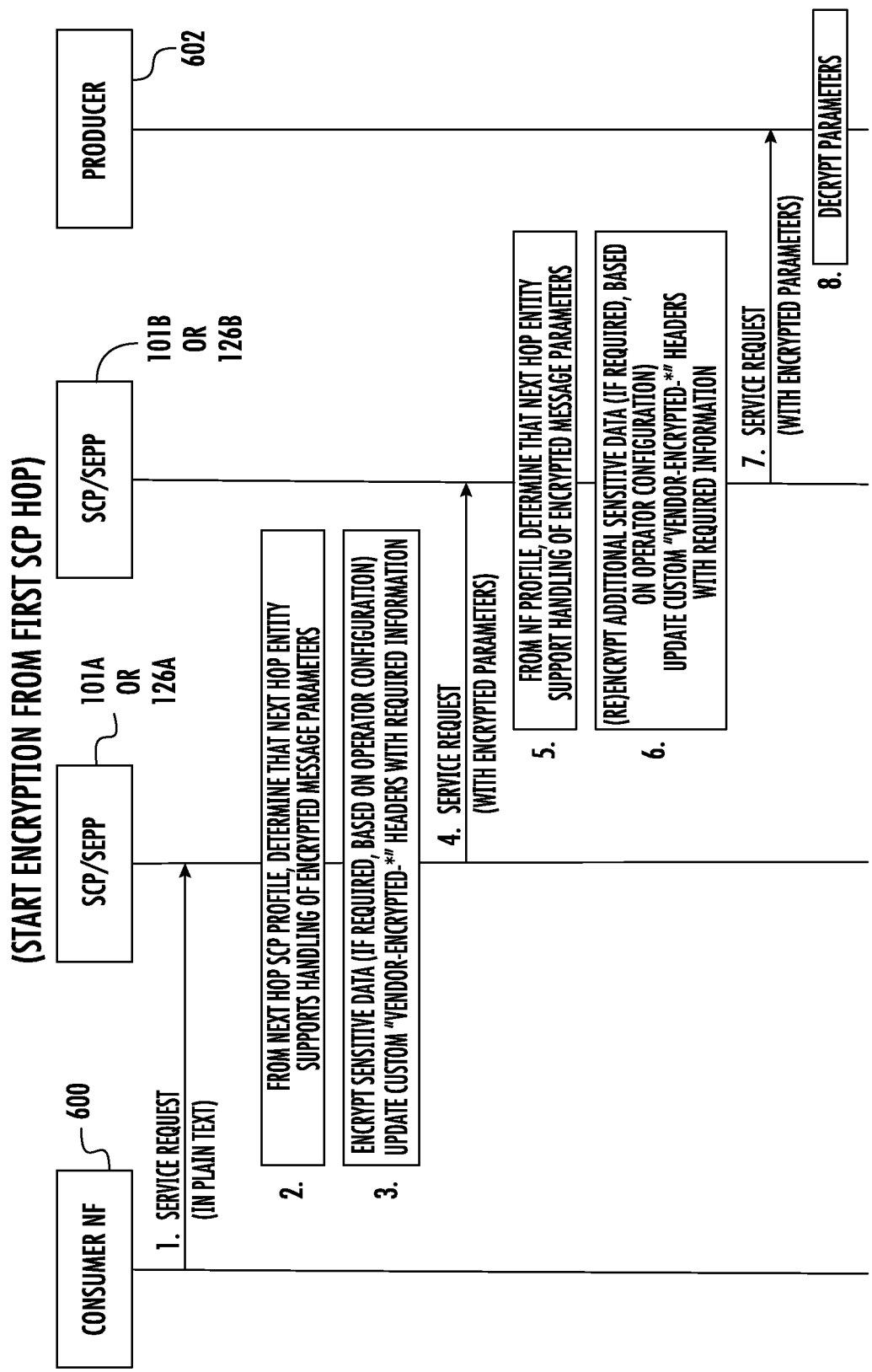
FIG. 7 is a message flow diagram illustrating exemplary messages exchanged when encryption of SBI request message parameters begins at the first-hop SCP or SEPP.

FIG. 7 is a message flow diagram illustrating exemplary messages exchanged when encryption of message parameters begins at the first-hop SCP or SEPP. Referring to FIG. 7, in step 1, consumer NF 600 sends an SBI request to next-hop SCP/SEPP 101A or 126A with sensitive data in plaintext, because consumer NF 600 does not support selective encryption of sensitive data in SBI requests.

In step 2, SCP/SEPP 101A or 126A receives the SBI request and determines whether the next-hop NF supports handling of encrypted SBI request message parameters. SCP/SEPP 101A or 126A may make this determination by accessing the SCP or SEPP profile of SCP/SEPP 101B or 126B that SCP/SEPP 101A or 126A obtained from the NRF using the NFDiscover or NFStatusSubscribe service operation. In step 3, SCP/SEPP 101A or 126A encrypts sensitive data in the message based on operator configuration and adds the custom vendor-encrypted-* headers with the required information. In step 4, SCP/SEPP 101A or 126A sends the message to next-hop SCP/SEPP 101B or 126B.

In step 5, SCP/SEPP 101B or 126B receives the SBI request message and determines from the NF or service profile of the next-hop NF whether the next-hop NF supports handling of encrypted SBI request message parameters. In this example, SCP/SEPP 101B or 126B determines that producer NF 602 supports handling of encrypted SBI request message parameters. Accordingly, in step 6, SCP/SEPP 101B or 126B performs the necessary encryption and/or decryption and re-encryption and updates the vendor-encrypted-* headers in the message based on the newly encrypted parameters. In step 7, SCP/SEPP 101B or 126B sends the SBI request to producer NF 602.

In step 8, producer NF 602 receives the SBI request, identifies the encrypted message parameters, and decrypts the encrypted message parameters using the data in the vendor-encrypted-* headers. Thus, using the methodology illustrated in FIG. 7, the first-hop SCP/SEPP and subsequent entities in the network provide support for selective encryption of message parameters and handling encrypted message parameters when the consumer NF that originates a message does not support encryption of selected message parameters.

Figure 8:
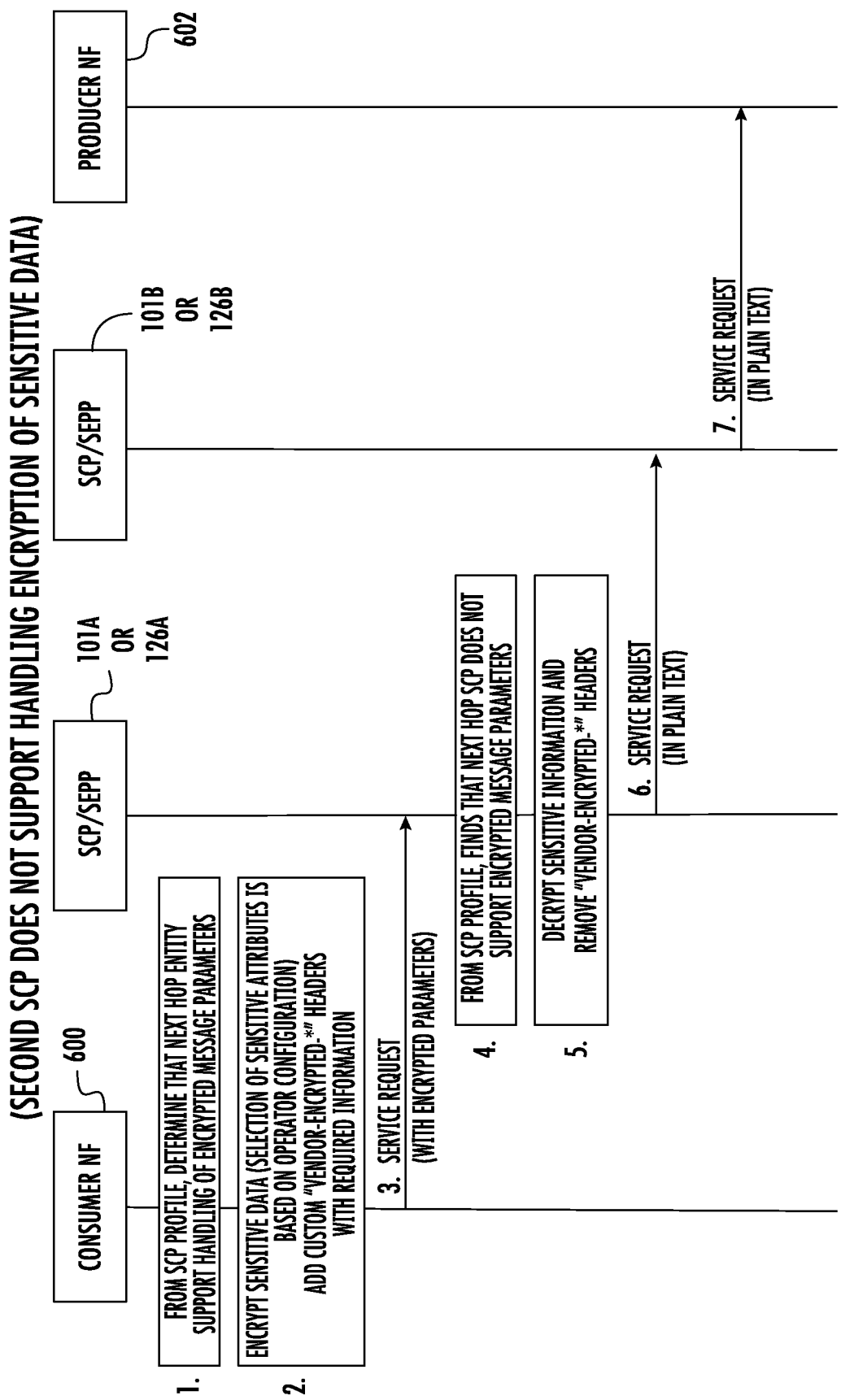
FIG. 8 is a message flow diagram illustrating exemplary messages exchanged when the first-hop SCP supports the handling of encrypted SBI request message parameters and the second-hop SCP does not support handling of encrypted SBI request message parameters.

FIG. 8 is a message flow diagram illustrating exemplary messages exchanged when the first-hop SCP supports the handling of encrypted SBI request message parameters, and the second-hop SCP does not support handling of encrypted SBI request message parameters. Referring to FIG. 8, in step 1, consumer NF 600 determines from the SCP or SEPP profile of first-hop SCP/SEPP 101A or 126A that first-hop SCP/SEPP 101A or 126A supports handling of encrypted SBI request message parameters. Accordingly, in step 2, consume NF 600 encrypts message parameters selected by the network operator that contain sensitive data, generates the vendor-encrypted-* headers, and adds the vendor-encrypted-* headers and the encrypted parameters to the SBI request. In step 3, consumer NF 600 sends the SBI request to next-hop SCP/SEPP 101A or 126A.

In step 4, SCP/SEPP 101A or 126A receives the SBI request and determines that the next-hop NF does not support handling of encrypted SBI request message parameters. SCP/SEPP 101A or 126A may make this determination by accessing the SCP or SEPP profile of SCP/SEPP 101B or 126B that SCP/SEPP 101A or 126A obtained from the NRF using the NFDiscover or NFStatusSubscribe service operation. In step 5, SCP/SEPP 101A or 126A decrypts the encrypted message parameters and removes the vendor-encrypted-* headers. In step 6, SCP/SEPP 101A or 126A sends the message with message parameters in plaintext format to next-hop SCP/SEPP 101B or 126B. In step 7, SCP/SEPP 101B or 126B receives, processes, and sends the SBI request with parameters in plaintext format to producer NF 602. Thus, FIG. 8 illustrates the case where in intermediate SCP or SEPP intelligently determines that a next-hop NF does not support handling of encrypted SBI request message parameters, decrypts the parameters, and removes the headers related to the formerly encrypted parameters before sending the message to the next-hop NF.

Figure 9:
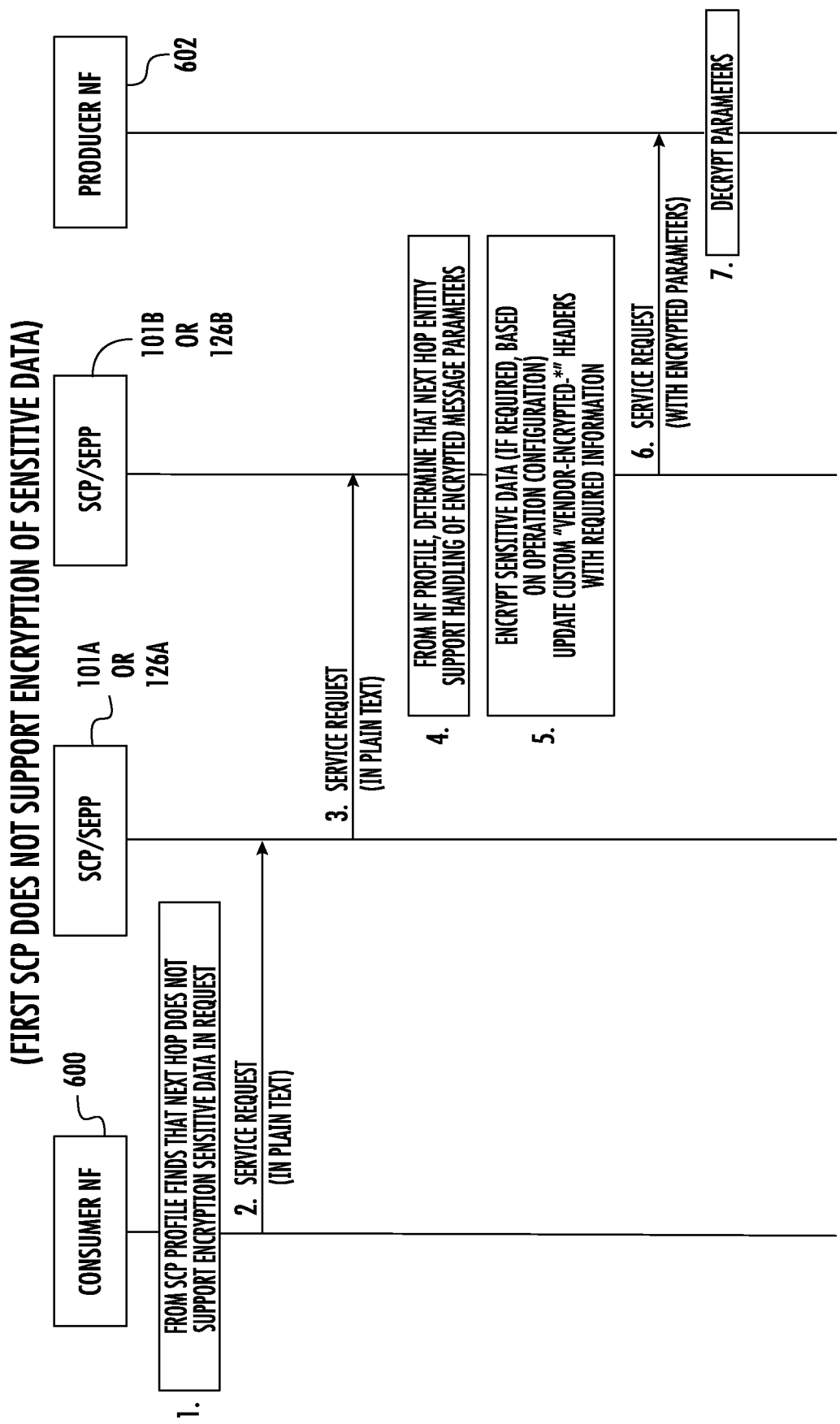
FIG. 9 is a message flow diagram illustrating messages exchanged when the first-hop SCP does not support handling of encrypted SBI request message parameters, the second-hop SCP or SEPP supports encryption of selected SBI request message parameters, and the producer NF supports handling of encrypted SBI request message parameters.

FIG. 9 is a message flow diagram illustrating messages exchanged when the first-hop SCP does not support handling of encrypted SBI request message parameters, the second-hop SCP or SEPP supports encryption of selected SBI request message parameters, and the producer NF supports handling of encrypted SBI request message parameters. Referring to FIG. 9, in step 1, consumer NF 600 determines from the SCP or SEPP profile of first-hop SCP/SEPP 101A or 126A that first-hop SCP/SEPP 101A or 126A does not support handling of encrypted SBI request message parameters. Accordingly, in step 2, consumer NF 600 sends an SBI request to next-hop SCP/SEPP 101A or 126A with sensitive data in plaintext format. In step 3, SCP/SEPP 101A or 126A receives the SBI request and forwards the SBI request with the sensitive data in plaintext format to next-hop SCP/SEPP 101B or 126B.

In step 4, SCP/SEPP 101B or 126B receives the SBI request message and determines from the NF or service profile of the next-hop NF whether the next-hop NF supports handling of encrypted SBI request message parameters. In this example, SCP/SEPP 101B or 126B determines that producer NF 602 supports handling of encrypted SBI request message parameters. Accordingly, in step 5, SCP/SEPP 101B or 126B encrypts selected message parameters and adds the vendor-encrypted-* headers to the message based on the encrypted parameters. In step 6, SCP/SEPP 101B or 126B sends the SBI request to producer NF 602.

In step 7, producer NF 602 receives the SBI request, identifies the encrypted message parameters, and decrypts the encrypted message parameters using the data in the vendor-encrypted-* headers. Thus, using the methodology illustrated in FIG. 9, the consumer NF determines not to encrypt message parameters when the first-hop SCP or SEPP does not support handling of encrypted SBI request message parameters and a subsequent SCP or SEPP in the routing path of an SBI request encrypts selected message parameters when the next-hop NF supports handling of encrypted SBI request message parameters.

Figure 10:
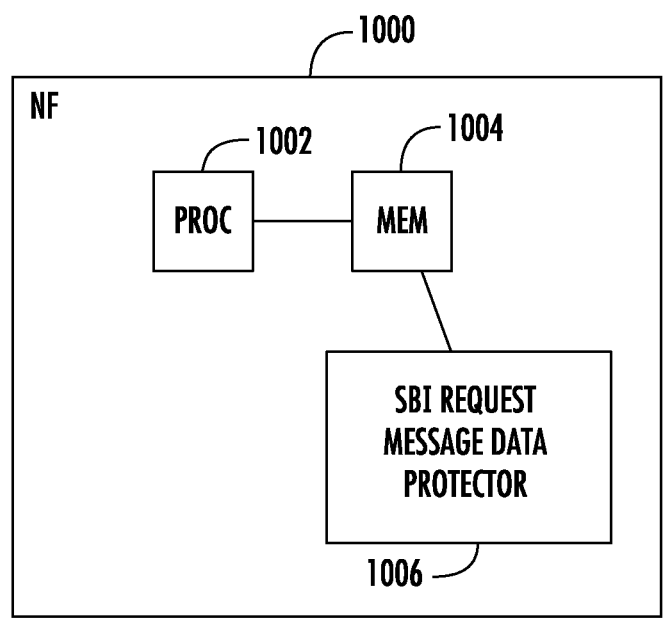
FIG. 10 is a block diagram of a network function that provides support for encryption of selected SBI request message parameters and for handling of encrypted SBI request message parameters.

FIG. 10 is a block diagram of a network function that provides support for encryption of selected SBI request message parameters and for handling of encrypted SBI request message parameters. Referring to FIG. 10, an NF 1000 includes at least one processor 1002 and a memory 1004. NF 1000 may be a consumer NF, a producer NF, an SCP, or an SEPP. NF 1000 further includes an SBI request message data protector 1006. SBI request message data protector 1006 may be implemented by processor 1002 for receiving or generating an SBI request message, identifying a next-hop NF of the SBI request message, determining, from a registered profile of the next-hop NF, whether the next-hop NF supports handling of encrypted SBI request message parameters, and, in response to determining that the next-hop NF supports handling of encrypted SBI request message parameters: encrypting selected SBI request message parameters; adding one or more headers to the SBI request message or updating one or more headers in the SBI request message to facilitate identification and decryption of the encrypted SBI request message parameters; and transmitting the SBI request message to the next-hop NF. SBI request message data protector 1006 may also encrypt selected SBI request message parameters and generate and add or update vendor-encrypted-* headers to the SBI request message before transmitting the message to a next-hop network function that supports handling of encrypted SBI request message parameters.

Figure 11:
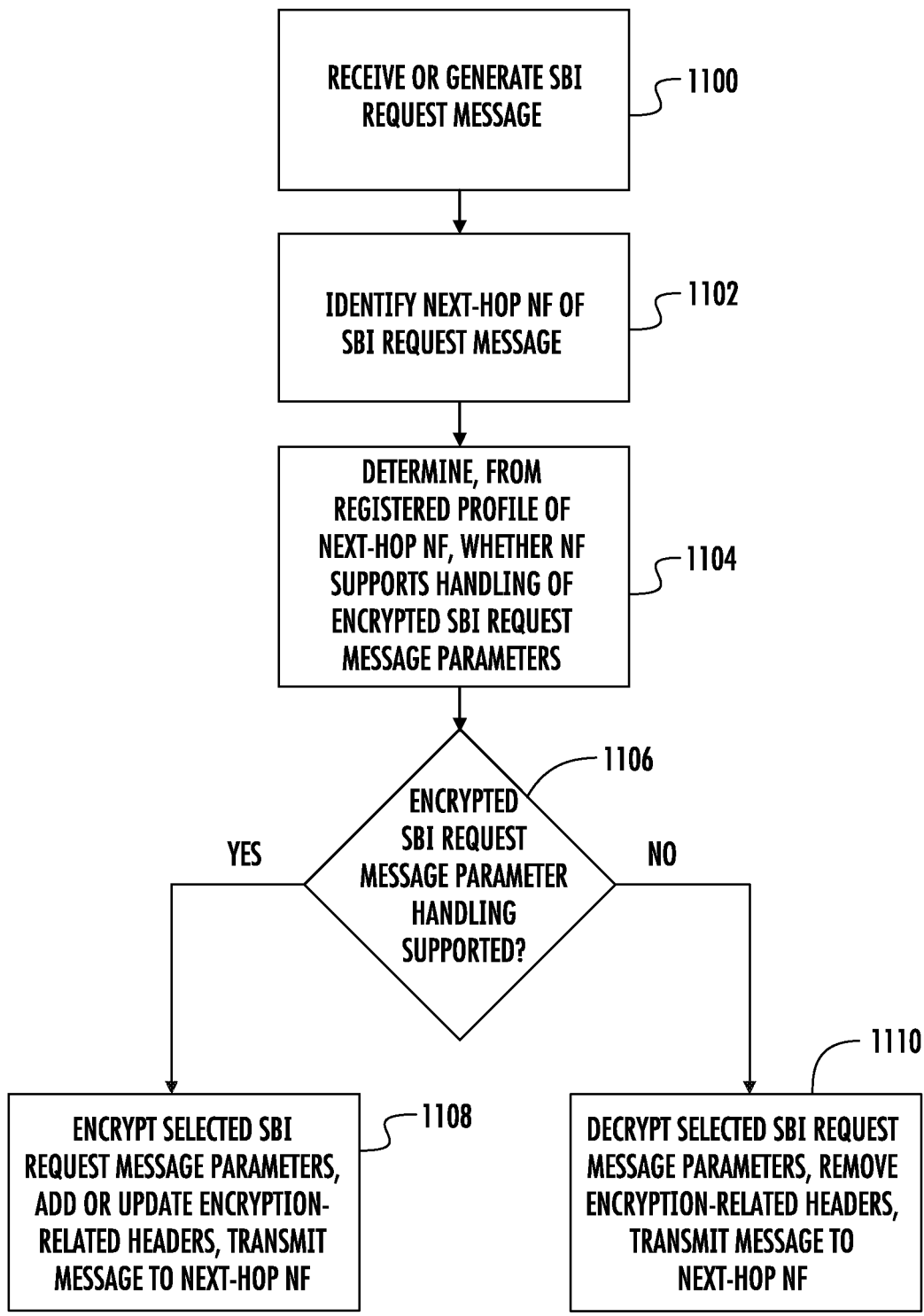
FIG. 11 is a flow chart illustrating an exemplary process for protecting sensitive data to be transmitted over a 5G or subsequent generation network.

FIG. 11 is a flow chart illustrating an exemplary process for protecting sensitive data to be transmitted over a 5G or subsequent generation network. Referring to FIG. 11, in step 1100, the process includes receiving or generating an SBI request message. For example, a message may be originated by a consumer NF or received by an intermediate NF, such as an SCP or SEPP.

In step 1102, the process includes identifying a next-hop NF of the SBI request message. If an NF is originating the message, depending on the communications model being used, the NF may send the message directly to the producer NF, in which case the producer NF is the next-hop NF or to an intermediate NF, such as an SCP or SEPP. If an NF is an intermediate NF, such as an SCP, the SCP may identify the next-hop NF using service identifying parameters in the message. For example, the SCP may identify a producer NF as the next-hop NF if the producer NF is in the same network as the originating NF. If an SEPP receives a message, the next-hop NF will be another SEPP if the message is leaving a network protected by the SEPP. If the message is entering a network protected by the SEPP, the next-hop NF will be an SCP or producer NF within the network protected by the SEPP.

In step 1104 and 1106, the process includes determining, from a registered profile of the next-hop NF, whether the next-hop NF supports handling of encrypted SBI request message parameters. For example, the NF processing or generating the SBI request may examine the NF, service, SCP, or SEPP profile of the next-hop NF, determine whether the NF profile includes the encryptedSensitiveData feature in the supportedVendorSpecificFeatures attribute. If the encryptedSensitiveData feature is present, the NF may determine that the next-hop NF supports handling of encrypted SBI request message parameters. If the encryptedSensitiveData feature is not present, the NF may determine that the next-hop NF does not support handling of encrypted SBI request message parameters.

In step 1108, the process includes, in response to determining that the next-hop NF supports handling of encrypted SBI request message parameters, encrypting selected SBI request message parameters, adding one or more headers to the SBI request message or updating one or more headers in the SBI request message to facilitate identification and decryption of the encrypted SBI request message parameters, and transmitting the SBI request message to the next-hop NF. For example, if the NF processing or sending the SBI request determines that the next-hop NF supports handling of encrypted SBI request message parameters, the NF may encrypt SBI request message parameters deemed by the network operator to contain sensitive data using a secret key shared with the next-hop NF. The NF may also add or update the vendor-encrypted-* headers to indicate which parameters are encrypted and to include cryptographic parameters, such as the key Id and the random string.

In step 1110, the process includes, in response to determining that the next-hop NF does not support handling of encrypted SBI request message parameters, decrypting any encrypted SBI request message parameters in the message, i.e., those encrypted by the previous-hop NF, removing encryption-related headers, and transmitting the message to the next-hop NF. Step 1110 will be performed for the case when an intermediate node, such as an SCP or SEPP, receives a message with encrypted SBI request message parameters and determines that the next-hop does not support handling of encrypted SBI request message parameters. The encrypted parameters will be decrypted using the shared secret key with the previous-hop NF. The vendor-encrypted-* headers will be removed. The encrypted parameters in the message will be replaced with the decrypted parameters, and the message will be transmitted to the next-hop NF with the SBI request message parameters in plaintext format.

The solution described herein works with communication model A, model B, model C and model D defined by Annex E of 3GPP TS 23.501. The solution provides for encryption from any NF to any other NF, including consumer NF to producer NF, consumer NF to SCP or SEPP, SCP to SEPP, SCP to SCP, SEPP to SCP. Thus, if SCPs are co-located with NFs, then SCPs can provide encrypted message flow from consumer NF to producer NF and vice-versa. If the encryption and decryption is provided by the intermediate nodes, such as SCPs and SEPPs, the consumer and producer NFs can remain unchanged. In some implementations, the source entity can determine which parameters are sensitive and can encrypt the selected parameters. Based on the vendor-encrypted-params header, the target entity can identify and decrypt the encrypted parameters. Similarly, intermediate entities can encrypt additional parameters (if required, based on operator policy on intermediate nodes). SEPPs can provide inter-PLMN protection through encryption of sensitive data. The ssolution can be used to encrypt sensitive data at interworking functions as well (e.g., at interworking functions between 4G and 5G networks). Since the solution is based on the supportedVendorSpecificFeatures attribute value, it can be enabled/disabled by the consumer NF, SCP, or SEPP through adding or removing the attribute value from its NF, service, SCP, or SEPP profile.

Selective SBI request message parameter encryption as described herein is advantageous over encryption at the TLS level because TLS encryption requires that the entire transport layer payload be encrypted, which is less efficient that encrypting selected message parameters deemed to have sensitive data. By encrypting only selected HTTP parameters and/or other 3GPP-defined subscriber or subscription-identifying parameters at the SBI request message level, the subject matter described herein is more efficient than TLS. In addition, the encryption performed herein can be enabled end-to-end or over multiple hops between a producer NF and a consumer NF without intermediate decryption and re-encryption if the hops use the same shared secret key. Even if intermediate decryption and re-encryption is required, the subject matter described herein provides end-to-end security, whereas TLS is only implemented point-to-point. Current deployments of HTTPs deploy NF as a sidecar, i.e., as an application that uses HTTPs as a service, which ensures security for sidecar communications between NFs and a load balancer and between the load balancer and an endpoint. In some instances, there could be message hops, such as in sidecar to application communication, without HTTPs security. The subject matter described herein provides end-to-end secure communication of sensitive data, avoiding the limitation of hop-by-hop security.

While the subject matter described herein relates to intelligently and selectively encrypting and decrypting SBI request message parameters transmitted in the network, it is understood that the intelligent SBI request message encryption and decryption will also be performed in the reverse direction for SBI response messages.

The disclosure of each of the following references is hereby incorporated herein by reference in its entirety.

REFERENCES 1. 3$^{rd}$ Generation Partnership Project; Technical Specification Group Services and System Aspects; System Architecture for the 5G System; Stage 2 (Release 17) 3GPP TS 23.501 V17.6.0 (2022-06)
2. 3$^{rd}$ Generation Partnership Project; Technical Specification Group Core Network and Terminals; 5G System; Network Function Repository Services; Stage 3 (Release 17) 3GPP TS 29.510 V17.6.0 (2022-06)
3. Townsley et al.; Layer Two Tunneling Protocol "L2TP", IETF RFC 2661, August 1999
4. Jones et al., JSON Web Signature (JWS), IETF RFC 7515, May 2015

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for protecting sensitive data to be transmitted over a 5G or subsequent generation network, the method comprising:

receiving or generating a service based interface (SBI) request message;
identifying a next-hop network function (NF) of the SBI request message;
determining, from a registered profile of the next-hop NF, whether the next-hop NF supports handling of encrypted SBI request message parameters; and
in response to determining that the next-hop NF supports handling of encrypted SBI request message parameters:
encrypting selected SBI request message parameters, wherein the selected SBI request message parameters include Third Generation Partnership Project (3GPP)-defined subscriber or subscription-identifying parameters at the SBI request message level, rather than a transport layer message level;
adding one or more headers to the SBI request message or updating one or more headers in the SBI request message to facilitate identification and decryption of the encrypted SBI request message parameters; and
transmitting the SBI request message to the next-hop NF.

2. The method of claim 1 wherein receiving or generating an SBI request message includes generating the SBI request message at a consumer NF.

3. The method of claim 1 wherein receiving or generating an SBI request message includes receiving or generating the SBI request message at a service communication proxy (SCP) or security edge protection proxy (SEPP).

4. The method of claim 1 wherein the registered profile includes a profile of the next-hop NF registered with an NF repository function (NRF).

5. The method of claim 1 wherein determining whether the next-hop NF supports handling of encrypted SBI request message parameters includes determining that the next-hop NF supports handling of encrypted SBI request message parameters and wherein encrypting selected SBI request message parameters includes encrypting SBI request message parameters deemed by a network operator to contain sensitive data.

6. A method for protecting sensitive data to be transmitted over a 5G or subsequent generation network, the method comprising:
receiving or generating a service based interface (SBI) request message;
identifying a next-hop network function (NF) of the SBI request message;
determining, from a registered profile of the next-hop NF, whether the next-hop NF supports handling of encrypted SBI request message parameters, and
in response to determining that the next-hop NF supports handling of encrypted SBI request message parameters:
encrypting selected SBI request message parameters;
adding one or more headers to the SBI request message or updating one or more headers in the SBI request message to facilitate identification and decryption of the encrypted SBI request message parameters; and
transmitting the SBI request message to the next-hop NF, wherein determining whether the next-hop NF supports handling of encrypted SBI request message parameters includes determining that the next-hop NF supports handling of encrypted SBI request message parameters, wherein encrypting selected SBI request message parameters includes encrypting SBI request message parameters deemed by a network operator to contain sensitive data, and wherein adding one or more headers to the SBI request message or updating one or more headers in the SBI request message includes adding or updating a first header identifying the encrypted SBI request message parameters and at least one second header including at least one parameter to facilitate decryption of the encrypted SBI request message parameters.

7. A method for protecting sensitive data to be transmitted over a 5G or subsequent generation network, the method comprising:
receiving or generating a service based interface (SBI) request message;
identifying a next-hop network function (NF) of the SBI request message;
determining, from a registered profile of the next-hop NF, whether the next-hop NF supports handling of encrypted SBI request message parameters, and
in response to determining that the next-hop NF supports handling of encrypted SBI request message parameters:
encrypting selected SBI request message parameters;
adding one or more headers to the SBI request message or updating one or more headers in the SBI request message to facilitate identification and decryption of the encrypted SBI request message parameters; and
transmitting the SBI request message to the next-hop NF, wherein:
receiving or generating the SBI request includes receiving the SBI request, where the SBI request includes encrypted SBI request message parameters and one or more headers to facilitate identification and decryption of the encrypted SBI request message parameters;
determining whether the next-hop NF supports handling of encrypted SBI request message parameters includes determining that the next-hop NF supports handling of encrypted SBI request message parameters and the method further comprises decrypting the encrypted SBI request message parameters;
encrypting the selected SBI request message parameters includes re-encrypting the decrypted SBI request message parameters using a secret key shared with the next-hop NF; and
adding one or more headers to the SBI request message or updating one or more headers in the SBI request message includes updating the one or more headers to identify the re-encrypted SBI request message parameters and to facilitate decryption of the re-encrypted SBI request message parameters by the next-hop NF.

8. A method for protecting sensitive data to be transmitted over a 5G or subsequent generation network, the method comprising:
receiving or generating a service based interface (SBI) request message;
identifying a next-hop network function (NF) of the SBI request message;
determining, from a registered profile of the next-hop NF, whether the next-hop NF supports handling of encrypted SBI request message parameters, and
in response to determining that the next-hop NF supports handling of encrypted SBI request message parameters:
encrypting selected SBI request message parameters;
adding one or more headers to the SBI request message or updating one or more headers in the SBI request message to facilitate identification and decryption of the encrypted SBI request message parameters; and
transmitting the SBI request message to the next-hop NF, wherein receiving or generating the SBI request message includes receiving the SBI request message, where the SBI request message includes encrypted SBI request message parameters and one or more headers to facilitate identification and decryption of the encrypted SBI request message parameters; and wherein determining whether the next-hop NF supports handling of encrypted SBI request message parameters includes determining that the next-hop NF does not support handling of encrypted SBI request message parameters and, in response:

decrypting the encrypted SBI request message parameters to produce plaintext SBI request message parameters;

replacing, in the SBI request message, the encrypted SBI request message parameters with the plaintext SBI request message parameters; and transmitting the SBI request message with the plaintext SBI request message parameters to the next-hop NF.

9. The method of claim 8 comprising detecting the presence of the encrypted SBI request message parameters using the one or more headers.

10. A system for protecting sensitive data to be transmitted over a 5G or subsequent generation network, the system comprising:

a network function (NF) including at least one hardware processor; and a service based interface (SBI) request message data protector implemented by the at least one processor for receiving or generating an SBI request message, identifying a next-hop NF of the SBI request message, determining, from a registered profile of the next-hop NF, whether the next-hop NF supports handling of encrypted SBI request message parameters, and, in response to determining that the next-hop NF supports handling of encrypted SBI request message parameters: encrypting selected SBI request message parameters, wherein the selected SBI request message parameters include Third Generation Partnership Project (3GPP)-defined subscriber or subscription-identifying parameters at the SBI request message level, rather than a transport layer message level; adding one or more headers to the SBI request message or updating one or more headers in the SBI request message to facilitate identification and decryption of the encrypted SBI request message parameters; and transmitting the SBI request message to the next-hop NF.

11. The system of claim 10 wherein the NF comprises a consumer NF.

12. The system of claim 10 wherein the NF comprises a service communication proxy (SCP) or security edge protection proxy (SEPP).

13. The system of claim 10 wherein the registered profile includes a profile of the next-hop NF registered with an NF repository function (NRF).

14. The system of claim 10 wherein the SBI request message data protector is configured to determine that the next-hop NF supports handling of encrypted SBI request message parameters and to encrypt SBI request message parameters deemed by a network operator to contain sensitive data.

15. A system for protecting sensitive data to be transmitted over a 5G or subsequent generation network, the system comprising:

a network function (NF) including at least one hardware processor; and a service based interface (SBI) request message data protector implemented by the at least one processor for receiving or generating an SBI request message, identifying a next-hop NF of the SBI request message, determining, from a registered profile of the next-hop NF, whether the next-hop NF supports handling of encrypted SBI request message parameters, and, in response to determining that the next-hop NF supports handling of encrypted SBI request message parameters: encrypting selected SBI request message parameters; adding one or more headers to the SBI request message or updating one or more headers in the SBI request message to facilitate identification and decryption of the encrypted SBI request message parameters; and transmitting the SBI request message to the next-hop NF, wherein the SBI request message data protector is configured to determine that the next-hop NF supports handling of encrypted SBI request message parameters and to encrypt SBI request message parameters deemed by a network operator to contain sensitive data and wherein the SBI request message data protector is configured to add or update a first header identifying the encrypted SBI request message parameters and at least one second header including at least one parameter to facilitate decryption of the encrypted SBI request message parameters.

16. A system for protecting sensitive data to be transmitted over a 5G or subsequent generation network, the system comprising:

a network function (NF) including at least one hardware processor; and a service based interface (SBI) request message data protector implemented by the at least one processor for receiving or generating an SBI request message, identifying a next-hop NF of the SBI request message, determining, from a registered profile of the next-hop NF, whether the next-hop NF supports handling of encrypted SBI request message parameters, and, in response to determining that the next-hop NF supports handling of encrypted SBI request message parameters: encrypting selected SBI request message parameters; adding one or more headers to the SBI request message or updating one or more headers in the SBI request message to facilitate identification and decryption of the encrypted SBI request message parameters; and transmitting the SBI request message to the next-hop NF, wherein the SBI request message data protector is configured to:

receive the SBI request, where the SBI request includes encrypted SBI request message parameters and one or more headers including data to facilitate identification and decryption of the encrypted SBI request message parameters;

determine that the next-hop NF supports handling of encrypted SBI request message parameters and decrypt the encrypted SBI request message parameters; and encrypt the selected SBI request message parameters by re-encrypting the decrypted SBI request message parameters using a secret key shared with the next-hop NF; and update the one or more headers to identify the re-encrypted SBI request message parameters and to facilitate decryption of the re-encrypted SBI request message parameters by the next-hop NF.

17. A system for protecting sensitive data to be transmitted over a 5G or subsequent generation network, the system comprising:

a network function (NF) including at least one hardware processor; and a service based interface (SBI) request message data protector implemented by the at least one processor for receiving or generating an SBI request message, identifying a next-hop NF of the SBI request message, determining, from a registered profile of the next-hop NF, whether the next-hop NF supports handling of encrypted SBI request message parameters, and, in response to determining that the next-hop NF supports handling of encrypted SBI request message parameters: encrypting selected SBI request message parameters: adding one or more headers to the SBI request message or updating one or more headers in the SBI request message to facilitate identification and decryption of the encrypted SBI request message parameters; and transmitting the SBI request message to the next-hop NF, wherein the SBI request message data protector is configured to receive the SBI request message, where the SBI request message includes encrypted SBI request message parameters and one or more headers to facilitate identification and decryption of the encrypted SBI request message parameters; and wherein the SBI request message data protector is configured to determine that the next-hop NF does not support handling of encrypted SBI request message parameters and, in response:

decrypt the encrypted SBI request message parameters to produce plaintext SBI request message parameters;

replace, in the SBI request message, the encrypted SBI request message parameters with the plaintext SBI request message parameters; and transmit the SBI request message with the plaintext SBI request message parameters to the next-hop NF.

18. The system of claim 17 wherein the SBI request message data protector is configured to detect the presence of the encrypted SBI request message parameters using the one or more headers.

19. A non-transitory computer readable medium having stored thereon executable instructions that when executed by a processor of a computer control the computer to perform steps comprising:

receiving or generating a service based interface (SBI) request message;

identifying a next-hop network function (NF) of the SBI request message;

determining, from a registered profile of the next-hop NF, whether the next-hop NF supports handling of encrypted SBI request message parameters; and in response to determining that the next-hop NF supports handling of encrypted SBI request message parameters:

encrypting selected SBI request message parameters, wherein the selected SBI request message parameters include Third Generation Partnership Project (3GPP)-defined subscriber or subscription-identifying parameters at the SBI request message level, rather than a transport layer message level;

adding one or more headers to the SBI request message or updating one or more headers in the SBI request message to facilitate identification and decryption of the encrypted SBI request message parameters; and transmitting the SBI request message to the next-hop NF.

* * * * *

UNITED STATES PATENT AND TRADEMARK OFFICE
CERTIFICATE OF CORRECTION

PATENT NO. : 12,348,955 B2
APPLICATION NO. : 17/987817
DATED : July 1, 2025
INVENTOR(S) : Krishan et al.

Page 1 of 1

It is certified that error appears in the above-identified patent and that said Letters Patent is hereby corrected as shown below:

In the Specification

In Column 18, Line 1, delete "ssolution" and insert -- solution --, therefor.

In the Claims

In Column 23, Line 7, in Claim 17, delete "parameters:" and insert -- parameters; --, therefor.

Signed and Sealed this
Fourteenth Day of October, 2025

John A. Squires
*Director of the United States Patent and Trademark Office*